US 8,597,476 B2

(12) United States Patent
Shyu

(10) Patent No.: US 8,597,476 B2
(45) Date of Patent: *Dec. 3, 2013

(54) ELECTROLYZER HAVING RADIAL FLOWING PASSAGE

(76) Inventor: Wen-Shing Shyu, Taichung (TW)

(*) Notice: Subject to any disclaimer, the term of this patent is extended or adjusted under 35 U.S.C. 154(b) by 390 days.

This patent is subject to a terminal disclaimer.

(21) Appl. No.: 12/308,448

(22) PCT Filed: Nov. 15, 2007

(86) PCT No.: PCT/CN2007/003234
§ 371 (c)(1),
(2), (4) Date: Sep. 6, 2011

(87) PCT Pub. No.: WO2009/033332
PCT Pub. Date: Mar. 19, 2009

(65) Prior Publication Data
US 2012/0031754 A1    Feb. 9, 2012

(30) Foreign Application Priority Data
Sep. 11, 2007    (CN) .......................... 2007 1 0148795

(51) Int. Cl.
*C25B 9/06*    (2006.01)
*C25B 9/08*    (2006.01)
*C02F 1/461*    (2006.01)

(52) U.S. Cl.
USPC ......... 204/278.5; 204/263; 205/742; 205/746

(58) Field of Classification Search
CPC .................................................... C02F 1/4618

USPC .......... 204/263, 278.5; 205/80–333, 746, 742
See application file for complete search history.

(56) References Cited

U.S. PATENT DOCUMENTS

| 4,125,439 A | * | 11/1978 | Fleischmann et al. ........ 205/639 |
| 4,342,636 A | | 8/1982 | Chang et al. .................. 204/296 |
| 4,867,856 A | * | 9/1989 | Okazaki .................... 204/230.5 |
| 5,534,120 A | * | 7/1996 | Ando et al. .................... 205/464 |
| 7,833,390 B2 | * | 11/2010 | Shyu ............................. 204/252 |

* cited by examiner

*Primary Examiner* — Nicholas A Smith
*Assistant Examiner* — Ciel Thomas
(74) *Attorney, Agent, or Firm* — Charles E. Baxley

(57) ABSTRACT

Electrolytic equipment in the form of radiation mode that is provided with pluralities of baffles (13) in the form of radiation mode on the top surface of the seat (10) and acidic water passage (131) is formed between the baffles (13). The top surface of the seat (10) has through holes (14) used to make anode conduction portions (33) of anode plate (30) through. In the center of the seat (10), there is a socket joint portion (11) that is provided with an inlet and outlet interval tube (15) in the center of it. There are plurality of equidistributed baffles (151, 157) on the inside wall and the outside wall of the inlet and outlet interval tube (15) to form raw water inlet passage (152) and acidic water outlet passage (153). There are protuberant ribs (16) for separating water inside of the seat (10) corresponding to the location for separating water around the anode plate (30) and the cathode plate (40), which are used to separate alkaline water and acidic water electrolyzed from the anode plate (30) and the cathode plate (40). Alkaline water passage (631) is formed on the bottom surface of the lid (60) and the center of lid (60) is provided with alkaline water outlet joint (61).

14 Claims, 16 Drawing Sheets

$Sa > Sb > Sc > Sd > Se$ $Ia < Ib < Ic < Id < Ie$

* # ELECTROLYZER HAVING RADIAL FLOWING PASSAGE

BACKGROUND OF THE INVENTION

1. Field of the Invention

The present invention relates to a radial flowing type electrolytic equipment, for stabilizing the alkaline water and the acidic water in the radial flowing type electrolytic equipment.

2. Description of the Prior Art

Typical erect electrolytic equipments have the following problems:

First, the inlet port and the outlet port of the erect electrolytic equipments have the same area or cross section, the entering speed and the discharging speed are equal or similar to each other, such that the outwardly flowing speed may not be reduced and such that interference or turbulence flow may be generated.

Second, the inlet port and the outlet port of the erect electrolytic equipments have the same area or cross section, the flowing speeds of the electrolytic water are also similar to each other, if the spacing distance between the electrolytic plates is increased, the resistance will be increased relatively, such that the electrolytic water at the outlet port will also be decreased, and such that the range of the neutral water will be decreased relatively, and such that the separating of the alkaline water and the acidic water will be difficult.

Third, the outlet ports for the alkaline water and the acidic water of the erect electrolytic equipments are normally arranged in the upper portion, the residual water will be remained in the electrolytic equipments after the electrolytic operations, such that an additional discharging equipment is further required to be provided and such that the cost will be increased, if the additional discharging equipment is not provided, germs may be grown in the residual water, and calcium may be deposited, and the oxidization potential may not be standardized in the next electrolytic operation because of the undischarged residual water.

Fourth, the inlet port of the erect electrolytic equipments is normally at the lower portion, and the outlet port at the upper portion, such that a predetermined water pressure is required, the equipments having the lower water pressure, such as the water tank for the drinking water machine, a pressurizing motor is required to pump the water, otherwise, the equipments may not be operated.

Fifth, the erect electrolytic equipments employ a number of screws, and the anode plate and the cathode plate may not be easily disassembled and assembled, and the manufacturing cost will be increased.

Sixth, the erect electrolytic equipments may not be installed in the tiny space below the water tank for the drinking water machine, and should be installed in the drinking water machine and may occupy a large volume of the drinking water machine, and should provide an outer tube to introduce the water into the erect electrolytic equipments, and an outlet tube is required to be coupled to the outlet port of the erect electrolytic equipments for discharging the alkaline water and the acidic water, this may increase difficult to assemble the machine, and the manufacturing cost will be increased, and calcium may be deposited in the outlet tube for the alkaline water.

Seventh, the spacing distance between the electrolytic plates is predetermined, and may not be adjusted for soft water area and hard water area, and the interference or turbulence flow may be generated.

SUMMARY OF THE INVENTION

The present invention has arisen to provide a radial flowing type electrolytic equipment, and to mitigate and/or obviate the afore-described disadvantages of the conventional erect electrolytic equipments.

For solving the first problem of the erect electrolytic equipments, the present invention employs the technique and has the first effect: as shown in FIG. 15, the radial flowing type electrolytic equipment is separated into five areas a, b, c, d, e from the center to the outer peripheral portion and the flowing speed of the electronic solution may be gradually slowed down or decreased from the center portion toward the outer peripheral portion $Sa>Sb>Sc>Sd>Se$, the alkaline water and the acidic water flow separately and parallel to each other and will not be interfered with each other, the flowing speed at Se' will thus be decreased or stabilized, and the interference or turbulence flow may be avoided.

For solving the second problem of the erect electrolytic equipments, the present invention employs the technique and has the second effect: as shown in FIG. 16, the radial flowing type electrolytic equipment is separated into five areas a, b, c, d, e from the center to the outer peripheral portion, and the electric current $Ia<Ib<Ic<Id<Ie$, the electric current at the outer peripheral portion is the largest, if the spacing distance between the electrolytic plates is increased, the electric current may be slightly decreased, but the electrolytic operations will not be affected, the range of the neutral water may be increased relatively, and the separating of the alkaline water and the acidic water will be easier.

For solving the third problem of the erect electrolytic equipments, the present invention employs the technique and has the third effect: when the electrolytic equipment is disposed horizontally, the outlet port may be provided in the lower portion for discharging the residual water, such that no additional discharging equipments are required, and such that the manufacturing cost may be decreased, and the germs growing problem in the residual water, and calcium depositing problem may be solved.

For solving the fourth problem of the erect electrolytic equipments, the present invention employs the technique and has the fourth effect: the anode plate and the cathode plate are disposed parallel to each other, the water flowing into the upper inlet port may stably flow radially and outwardly, such that the electrolytic equipment may be disposed in the lower portion of the water tank for the drinking water machine for electrolyzing the water from the drinking water machine.

For solving the fifth problem of the erect electrolytic equipments, the present invention employs the technique and has the fifth effect: the lower housing and the upper cover are superposed and lockable with inner and outer threads, without screws, such that the disassembling and the assembling operations may be facilitated.

For solving the sixth problem of the erect electrolytic equipments, the present invention employs the technique and has the sixth effect: the radial flowing type electrolytic equipment includes a flat structure for mounting in the lower portion of the water tank for the drinking water machine without occupying the space, and the water may be directly introduced into the electrolytic equipment from the water tank of the drinking water machine without additional coupling tubes and without calcium cleaning problems.

For solving the seventh problem of the erect electrolytic equipments, the present invention employs the technique and has the seventh effect: the lower housing and the upper cover are designed into disc shaped, and the inlet portion is at the center portion, and the outlet ports are at the outer peripheral portion, the spacing distance between the anode plate and the cathode plate may be suitably adjusted with various spacing members, for allowing the water to smoothly flow through the space between the anode plate and the cathode plate and for allowing the alkaline water and the acidic water to be suitably spaced from each other.

In accordance with one aspect of the invention, there is provided an electrolyzer comprising a

Figure 1:
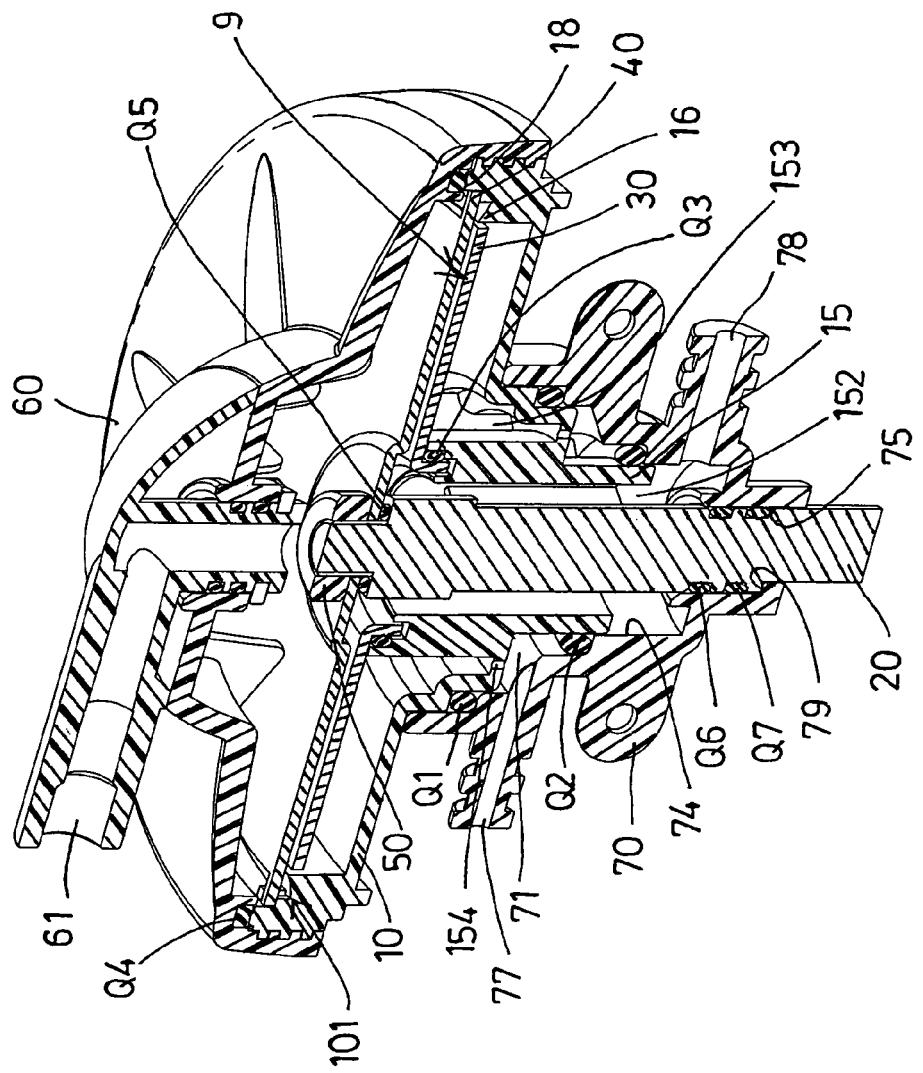
FIG. 1 is a perspective view of an electrolytic cell or electrolyzer in accordance with the present invention having a radial flowing passage, in which one half of the electrolytic cell or electrolyzer has been cut off for showing an inner structure of the electrolytic cell or electrolyzer.

The reference numerals are described as follows:
10 housing 11 casing 111 catch
12 stud 13 rib 131 upper space
14 orifice 15 cylindrical member 151 fin
157 fin 152 bore 153 peripheral channel
154 outlet port 155 peripheral recess 156 peripheral shoulder
16 separator tip 161 spacer 162 spacer
163 protrusion 164 protrusion 17 outer thread
18 peripheral shoulder 20 conductor tube 21 fastener
22 peripheral shoulder 23 bore 30 anode plate
31 center hole 32 fence 33 electrode
40 cathode plate 41 bore 42 peripheral recess
43 fingers 50 fastener 60 cover
61 outlet mouth 62 compartment 63 rib
631 chamber 64 inner thread 65 peripheral shoulder
70 receptacle 701 latch groove 71 compartment
72 peripheral surface 79 peripheral shoulder 74 chamber
75 conduit 77 outlet port 78 inlet port
80 electric connecting device 81 socket
82 conductor 83 cap 84 casing
85 conductor 90 check valve 91 container
92 threading engagement 93 gasket 94 detent
100 membrane N lock nut
Q1~Q7 sealing ring S1~S3 spring

DETAILED DESCRIPTION OF THE PREFERRED EMBODIMENT

Figure 2:
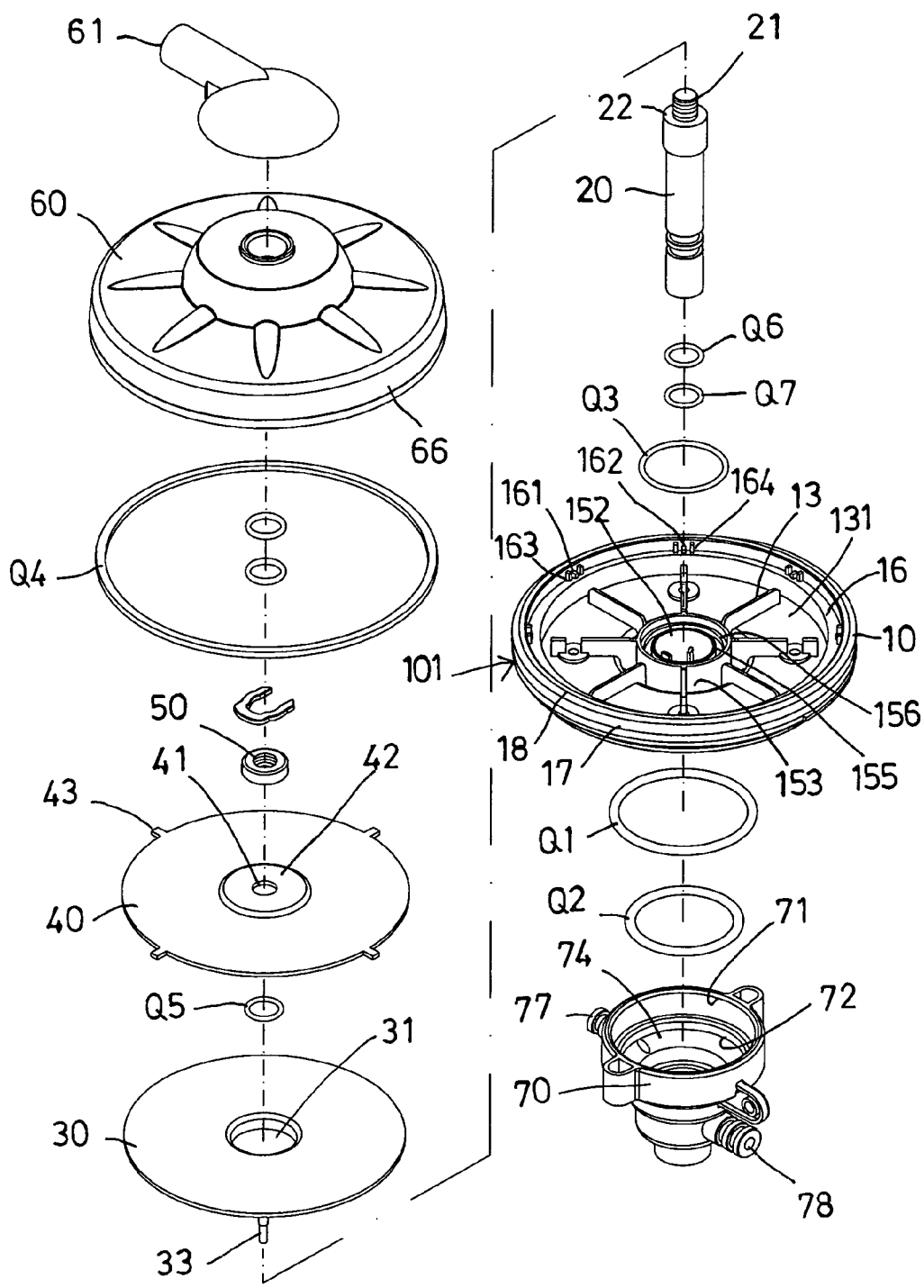
FIG. 2 is an exploded view of the electrolytic cell or electrolyzer, as seen from the upper portion of the electrolytic cell or electrolyzer.
Figure 3:
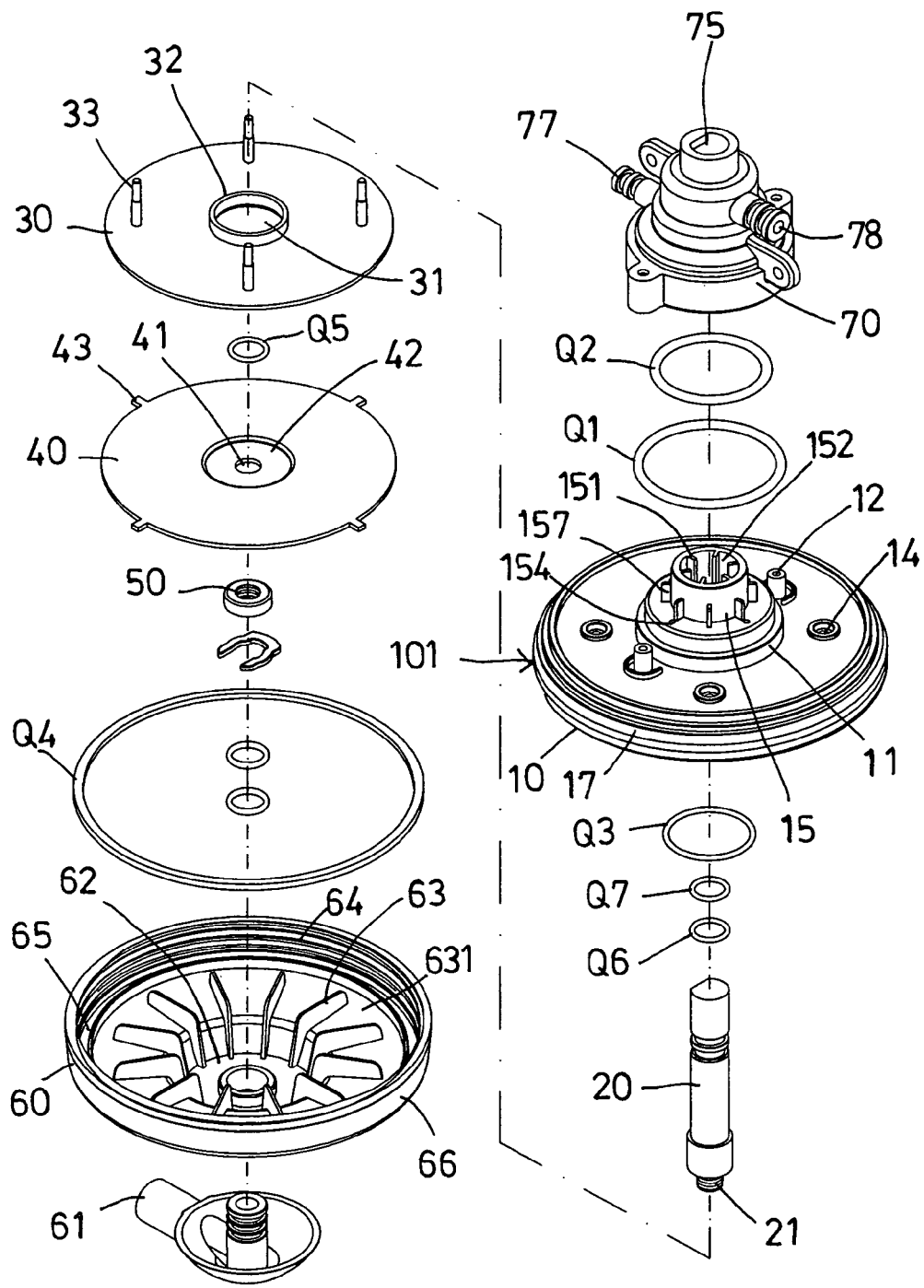
FIG. 3 is another exploded view of the electrolytic cell or electrolyzer, as seen from the bottom portion of the electrolytic cell or electrolyzer.

For allowing the specialized persons having ordinary skill in the art to release the structure and the characteristics and the functions of the present invention, four embodiments are disclosed herewith by accompanying with the enclosed drawing figures:

FIG. 1 shows a perspective and cross sectional view of the first embodiment of the radial flowing type electrolyzer. FIGS. 2, 3 are exploded views of the first embodiment of the electrolytic cell or electrolyzer. The first embodiment of the electrolytic cell or electrolyzer in accordance with the present invention comprises a housing 10, a conductor tube 20, an anode plate 30, a cathode plate 40, a fastener 50, a cover 60, a receptacle 70 and several sealing rings Q1~Q7.

The housing 10 is disc-shaped. The housing 10 includes a casing 11 extended downwardly therefrom for engaging into and for coupling to the receptacle 70 with several sealing rings Q1~Q7. The housing 10 includes one or more studs 12 for threading and securing to the receptacle 70. The housing 10 includes a number of radially extended ribs 13 on the upper portion for mounting the anode plate 30, and includes an upper space 131 formed therein and located between the ribs 13. The housing 10 includes four equally spaced orifices 14 formed therein for engaging with four positive electrodes 33 of the anode plate 30. The casing 11 includes a cylindrical member 15 extended into the casing 11 and includes a number of radially extended baffles or fins 151 extended in the casing 11 and a number of baffles or fins 157 extended outside the casing 11, the fins 151 may position and center the conductor tube 20 in the casing 11 and for forming a flowing passage or bore 152 in the cylindrical member 15, the fins 157 may position and center the receptacle 70 and may form a peripheral channel 153 in the outer portion of the cylindrical member 15. One or more outlet ports 154 are formed and located below the peripheral channel 153, the cylindrical member 15 includes a peripheral recess 155 and a peripheral shoulder 156 formed in the upper or inner portion, the peripheral recess 155 is provided for engaging with the anode plate 30, and the peripheral shoulder 156 is provided for mounting the sealing ring Q3, for preventing the electrolytic solution or water and the catholyte 88 from being mixed with each other.

The housing 10 includes an annular or circular shaped separator tip 16 formed and located in the outer peripheral portion of the anode plate 30 and the cathode plate 40, for suitably separating the anolyte 99 and the catholyte 88 from each other and for preventing the anolyte 99 and the catholyte 88 from being mixed or blended with each other. The separator tip 16 includes a number of equally spaced first spacers 161 and second spacers 162 for engaging with the conductor tube 20 and the cathode plate 40 and the sealing ring Q5 for suitably separating or spacing the cathode plate 40 and the anode plate 30 from each other. One or more protrusions 163, 164 are extended and located beside the spacers 161, 162 for preventing the anode plate 30 from rotating. The housing 10 includes an outer thread 17 formed on the outer peripheral portion of the peripheral wall 101 for threading or engaging with the cover 60. The housing 10 includes an inner peripheral shoulder 18 formed in the inner portion of the peripheral wall 101 for engaging with the sealing ring Q5 and for water sealing purposes.

The conductor tube 20 includes a threaded member or screw or fastener 21 and a peripheral shoulder 22 for engaging with a fastener or nut 50 and for securing the cathode plate 40 with the sealing ring Q5 which is engaged with the spacers 161, 162 of different heights. The other end of the conductor tube 20 is extended out through the receptacle 70 and engaged with the sealing ring Q6-Q7 and coupled to the negative electric power source.

The anode plate 30 is disc-shaped. The anode plate 30 includes a center hole 31 formed therein and defined by a peripheral fence 32, and includes four positive electrodes 33, the peripheral fence 32 may prevent the anode plate 30 from being distorted and is provided for receiving or engaging with the peripheral recess 155 of the cylindrical member 15, and is engaged with the sealing rings Q3 for preventing the electrolytic solution or water and the catholyte 88 from being mixed with each other.

The cathode plate 40 is disc-shaped. The cathode plate 40 includes a bore 41 formed therein for receiving or engaging with the fastener 21 of the conductor tube 20, and includes a punched or forged inner peripheral recess 42 for preventing the cathode plate 40 from being distorted, the cathode plate 40 includes one or more fingers 43 extended radially and outwardly of the cathode plate 40 for engaging with either of the spacers 161, 162 and for suitably separating or spacing the cathode plate 40 and the anode plate 30 from each other at selected spacing distances.

The fastener or nut 50 is made of conductive materials, for engaging with the fastener 21 of the conductor tube 20, and for solidly securing the conductor tube 20 and the cathode plate 40 together.

The cover 60 is disc-shaped. The cover 60 includes an outlet mouth 61 provided on the upper portion, the outlet mouth 61 includes a compartment 62 formed therein, and includes a number of radially extended ribs 63 extended into the compartment 62 for mounting the cathode plate 40 and for forming a chamber 631 in the cover 60. The cover 60 includes an inner thread 64 formed therein for threading or engaging with the outer thread 17 of the housing 10. The cover 60 includes an inner peripheral shoulder 65 formed therein for engaging with one or more sealing rings Q4 may be engaged with the housing 10 for making a water tight seal between the housing 10 and the cover 60.

The receptacle 70 is hollow and includes three shoulders of different inner diameters, such as a compartment 71, an inner peripheral surface 72 and an inner peripheral shoulder 79 formed in the lower portion thereof, in which the compartment 71 has the largest inner diameter, the inner peripheral surface 72 has the second largest inner diameter, and the inner peripheral shoulder 79 has the smallest inner diameter, a chamber 74 is formed between the compartment 71 and the inner peripheral surface 72, and the inner peripheral shoulder 79 includes a reduced or narrowed conduit 75 formed in the lower portion thereof for positioning the conductor tube 20. The receptacle 70 includes one or more cavities 76 formed therein for engaging with the studs 12 and for securing the housing 10. The receptacle 70 includes a first or outlet port 77 formed therein and communicating with the chamber 74 of the receptacle 70 and engaged with sealing rings Q2. The receptacle 70 includes a second or inlet port 78 formed therein and also communicating with the space between the inner peripheral surface 72 and the inner peripheral shoulder 79, and engaged with sealing rings Q2, Q6, Q7.

Figure 4:
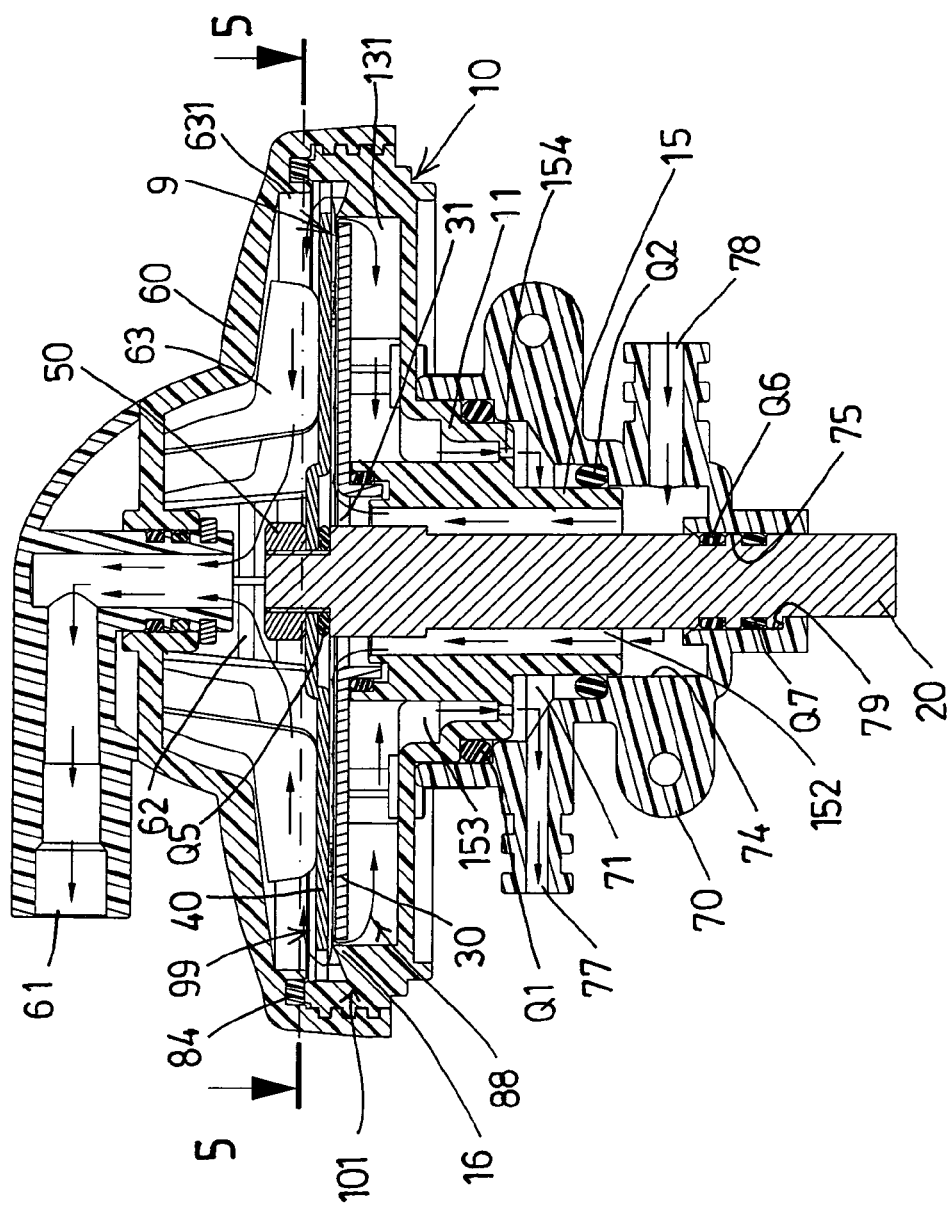
FIG. 4 is a cross sectional view of the electrolyzer as seen from one side portion of the electrolytic cell or electrolyzer of that shown in FIG. 1.
Figure 5:
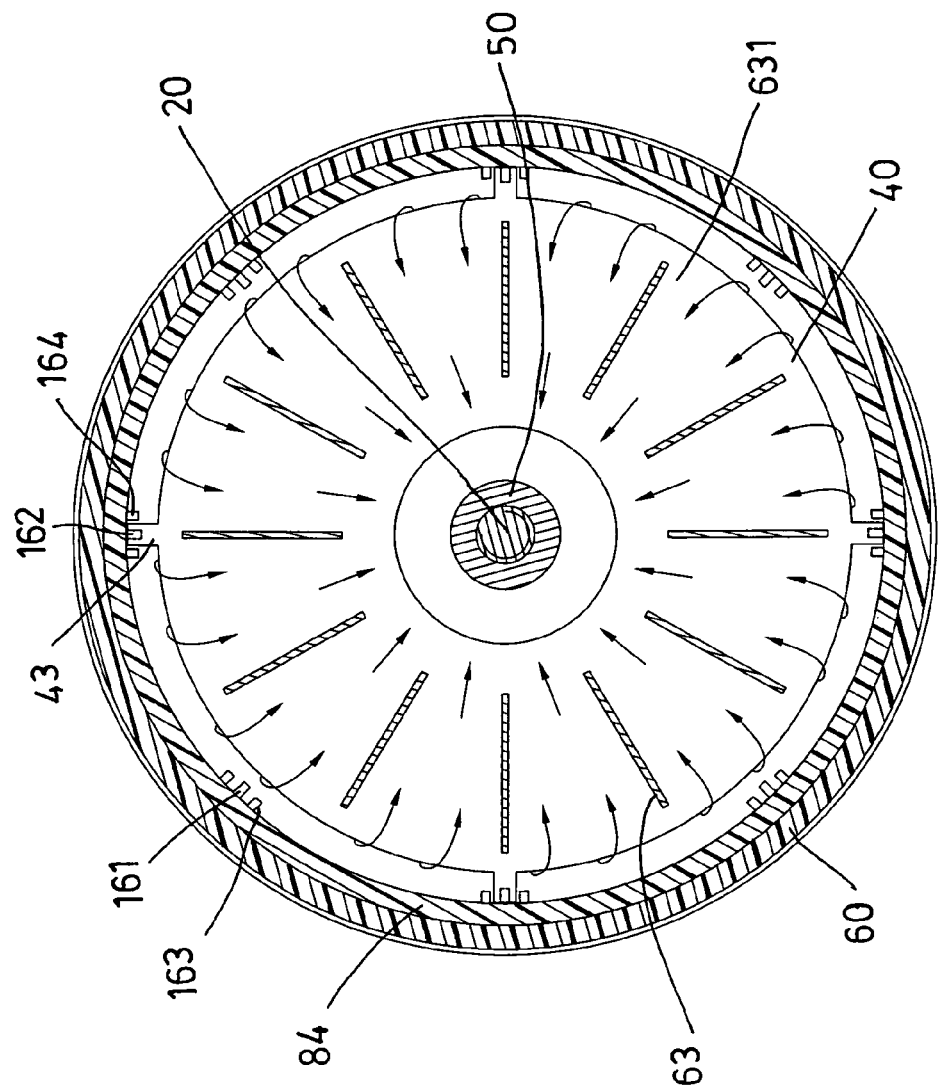
FIG. 5 is a cross sectional view of the electrolyzer taken along lines 5-5 of FIG. 4.

In the first embodiment, the electrolytic operation is shown in FIGS. 4 and 5. FIGS. 4 and 5 show the operating condition and the cross section of the first embodiment. The electrolytic solution or water flows through the second or inlet port 78 of the receptacle 70 and into the housing 10, and then flows into the bore 152 of the cylindrical member 15 that is formed and defined by the fins 151 (FIG. 3), and then flows into the center hole 31 of the anode plate 30 and then to flow horizontally and radially and outwardly, and for generating the anolyte 99 and the catholyte 88 with the cathode plate 40 and the anode plate 30 while conducting the electrolytic operation, and for suitably separating the anolyte 99 and the catholyte 88 from each other with the separator tip 16, and for preventing the anolyte 99 and the catholyte 88 from being mixed or blended with each other.

The catholyte 88 may flow downwardly and may flow into the into the space 131 of the housing 10 that is formed and defined by the ribs 13 (FIG. 2), and then flows into the peripheral channel 153 of the cylindrical member 15 that is formed and defined by the fins 157 (FIG. 3), and then flows out through the outlet ports 154 and into the chamber 74 of the receptacle 70, and then flows out through the outlet port 77 of the receptacle 70, for allowing the catholyte 88 to be collected for further use.

The anolyte 99 may flow into the chamber 631 that is formed and defined by the ribs 63, and into the compartment 62 of the cover 60, and then may flow out through the outlet mouth 61 of the cover 60.

Figure 6:
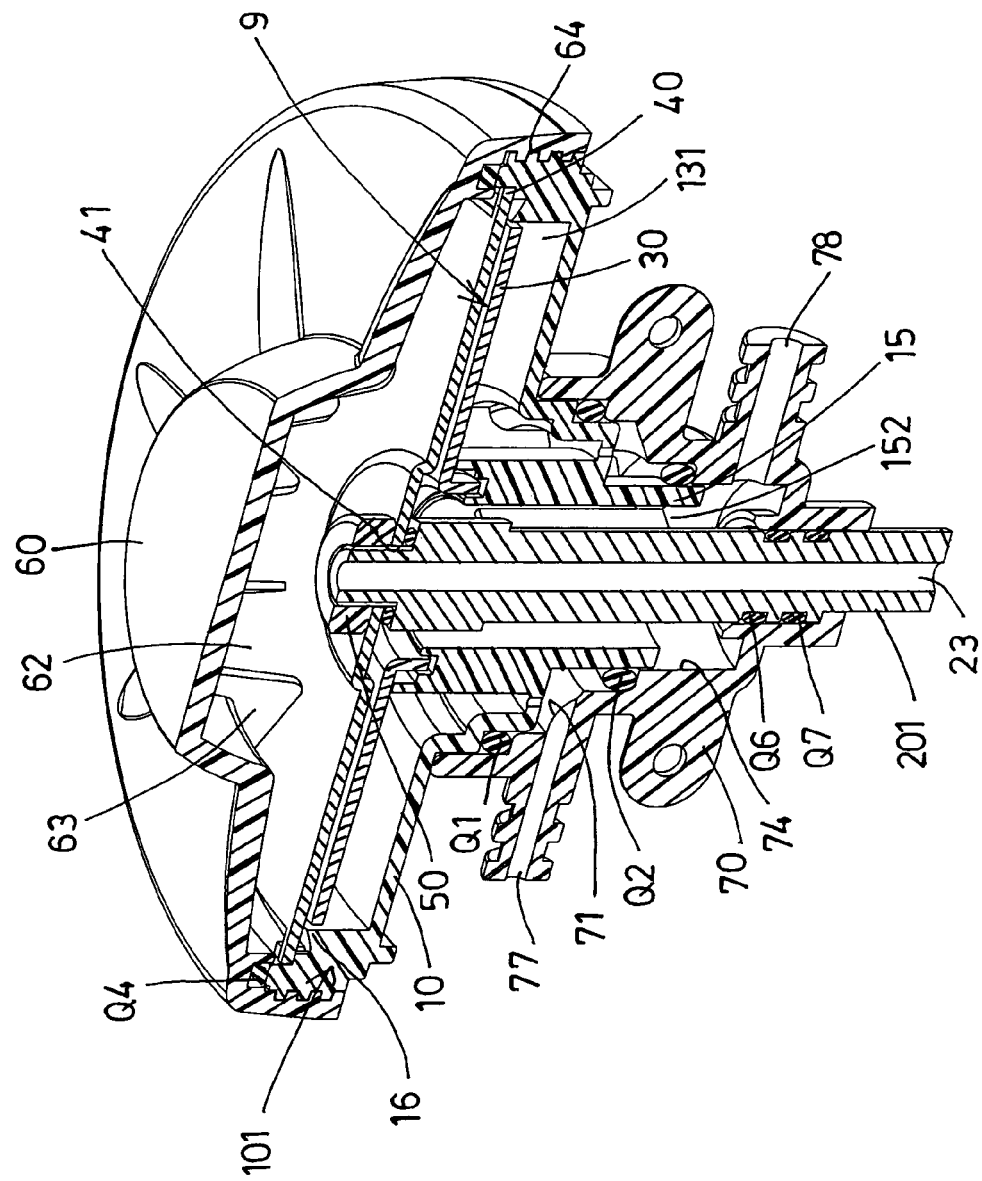
FIG. 6 is another perspective view similar to FIG. 1, illustrating the other arrangement of the electrolyzer.
Figure 7:
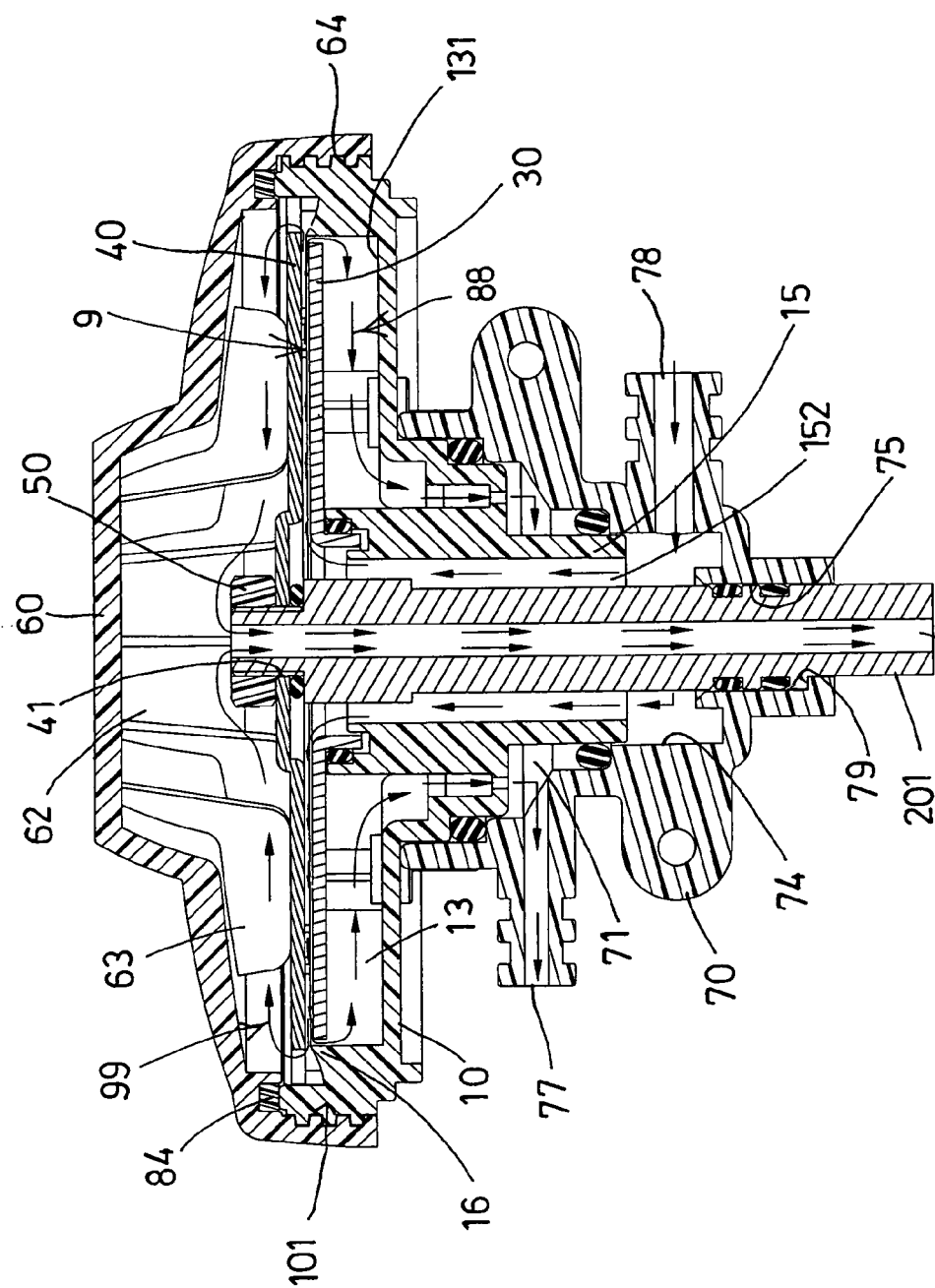
FIG. 7 is a cross sectional view of the electrolyzer as shown in FIG. 6.

In the second embodiment, the radial flowing type electrolyzer in accordance with the present invention may be arranged in the form as disclosed in the previous first embodiment (as shown in FIG. 1), i.e., the anolyte 99 may flow out through the outlet mouth 61 of the cover 60, except this, the radial flowing type electrolyzer in accordance with the present invention may also be arranged in the form as a second embodiment, as shown in FIGS. 6 and 7. FIG. 6 shows a perspective and cross sectional view of the second embodiment, and FIG. 7 shows the operating condition of the second embodiment. The anolyte 99 may flow out through the bore 23 of the conductor tube 201, in which the outlet mouth 61 of the cover 60 (FIG. 1) has been blocked, and the anolyte 99 may directly flow through the bore 23 of the conductor tube 201 and then flow out of the bore 23 of the conductor tube 201.

Figure 8:
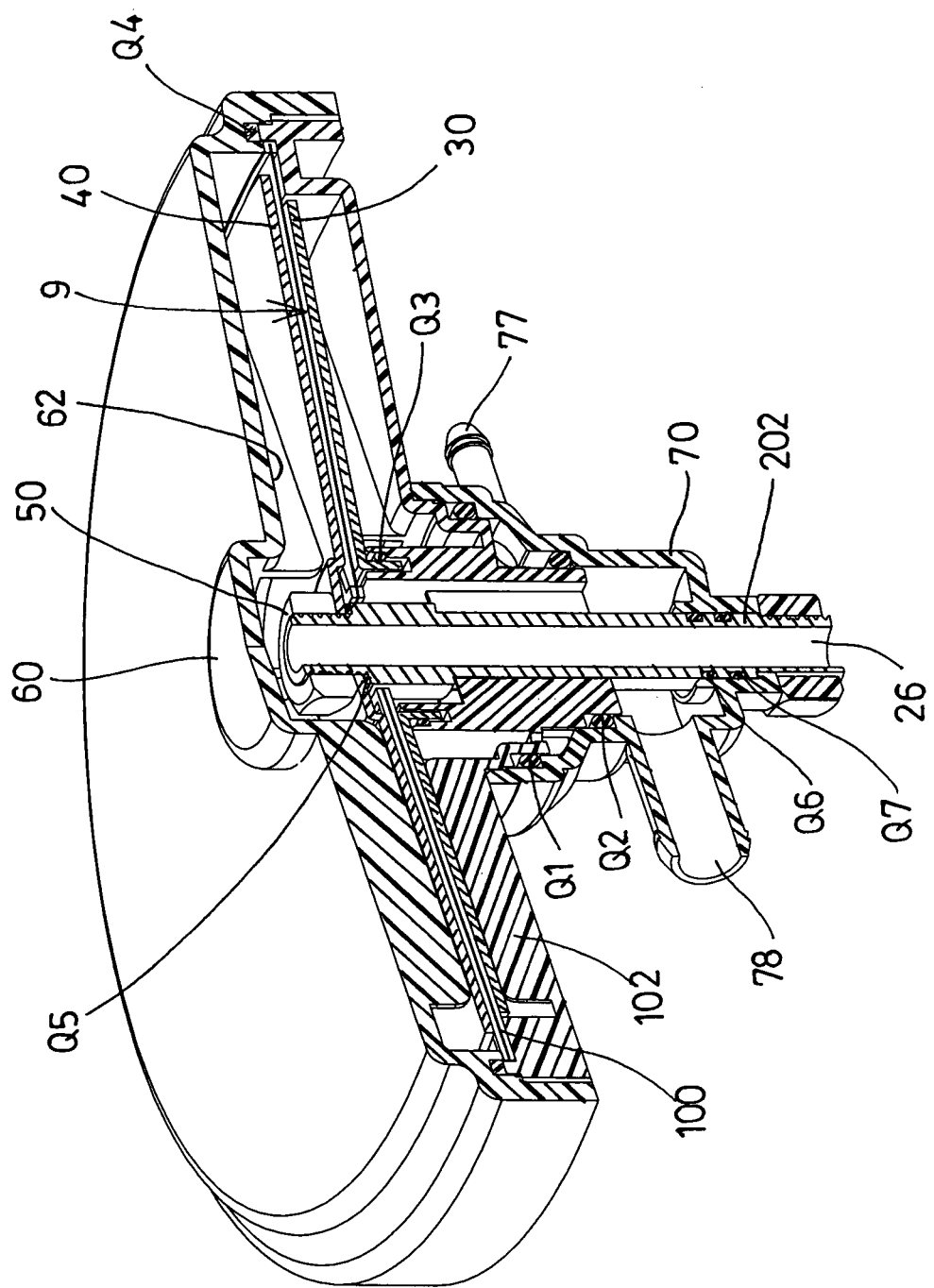
FIG. 8 is a further perspective view similar to FIGS. 1 and 6, illustrating the further arrangement of the electrolyzer.
Figure 9:
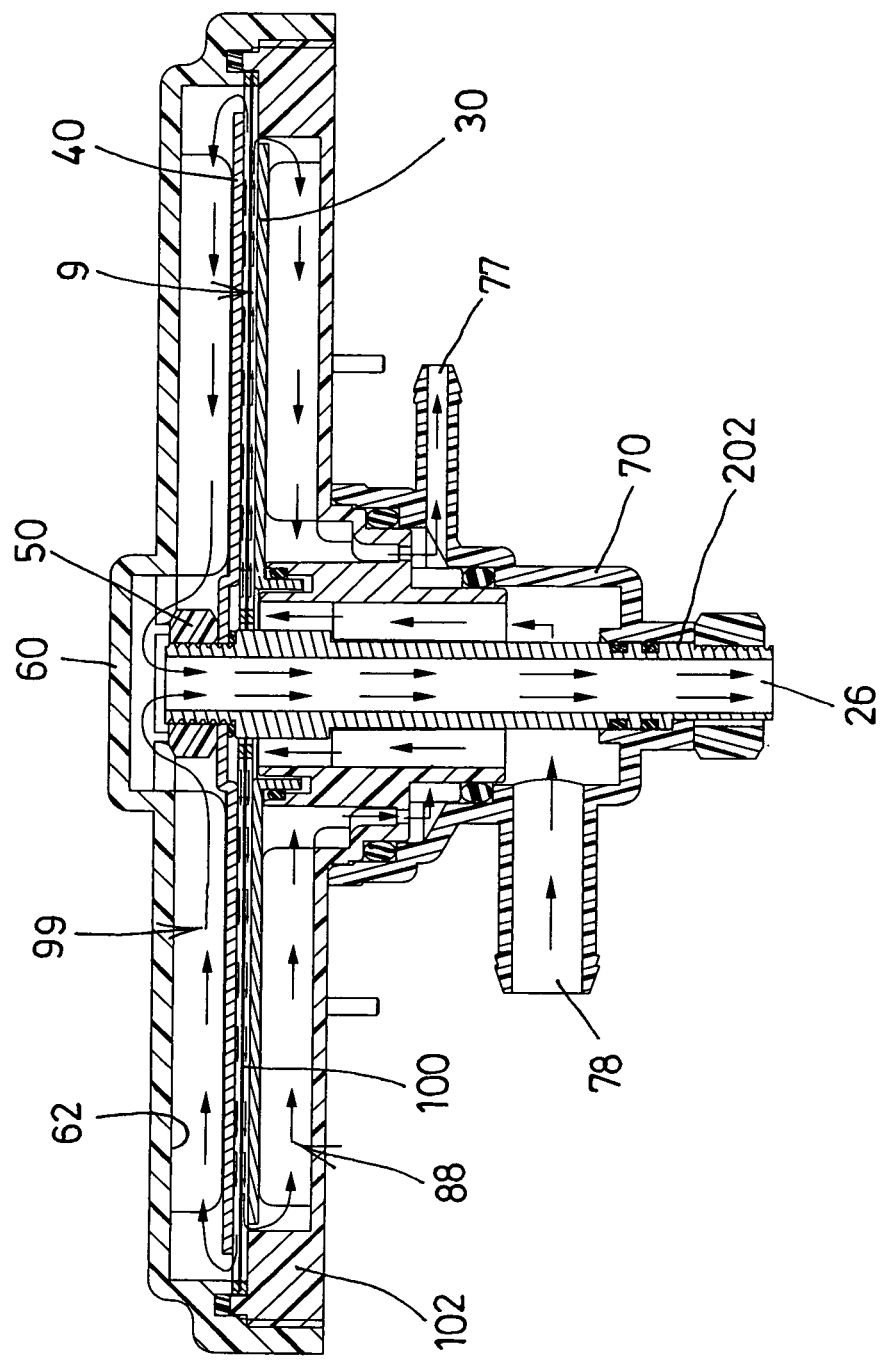
FIG. 9 is a cross sectional view of the electrolyzer as shown in FIG. 8.

In the third embodiment, the radial flowing type electrolyzer in accordance with the present invention is shown in FIGS. 8 and 9. FIG. 8 shows a perspective and cross sectional view of the third embodiment, and FIG. 9 shows the operating condition of the third embodiment. An ion exchanging film or membrane 100 may be disposed or arranged in the gap 9 that is formed between the anode plate 30 and the cathode plate 40 for suitably separating the anolyte 99 and the catholyte 88 from each other, instead of the separator tip 16 (FIG. 6) for the second embodiment.

Figure 10:
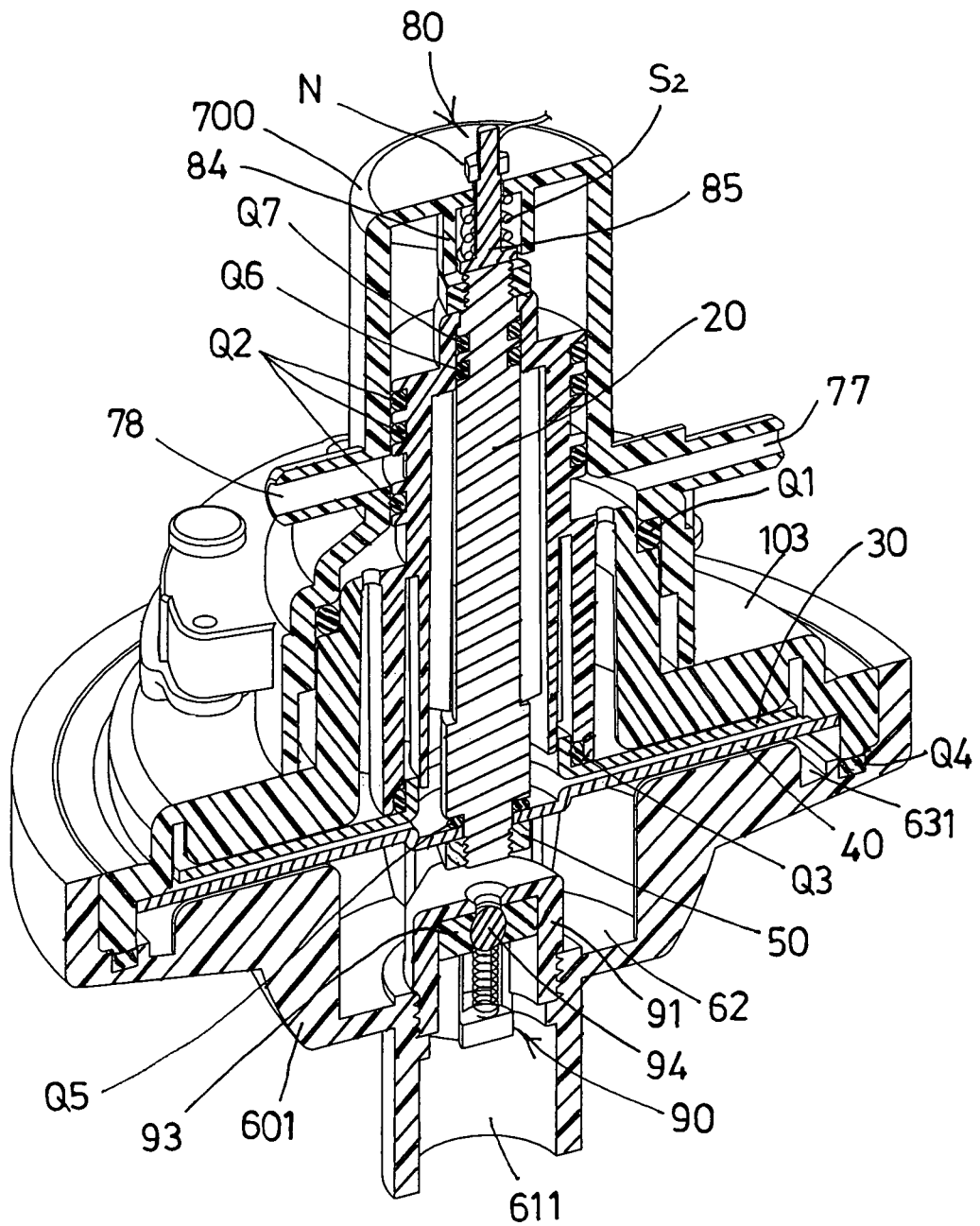
FIG. 10 is a still further perspective view similar to FIGS. 1, 6 and 8, illustrating the still further arrangement of the electrolyzer.
Figure 11:
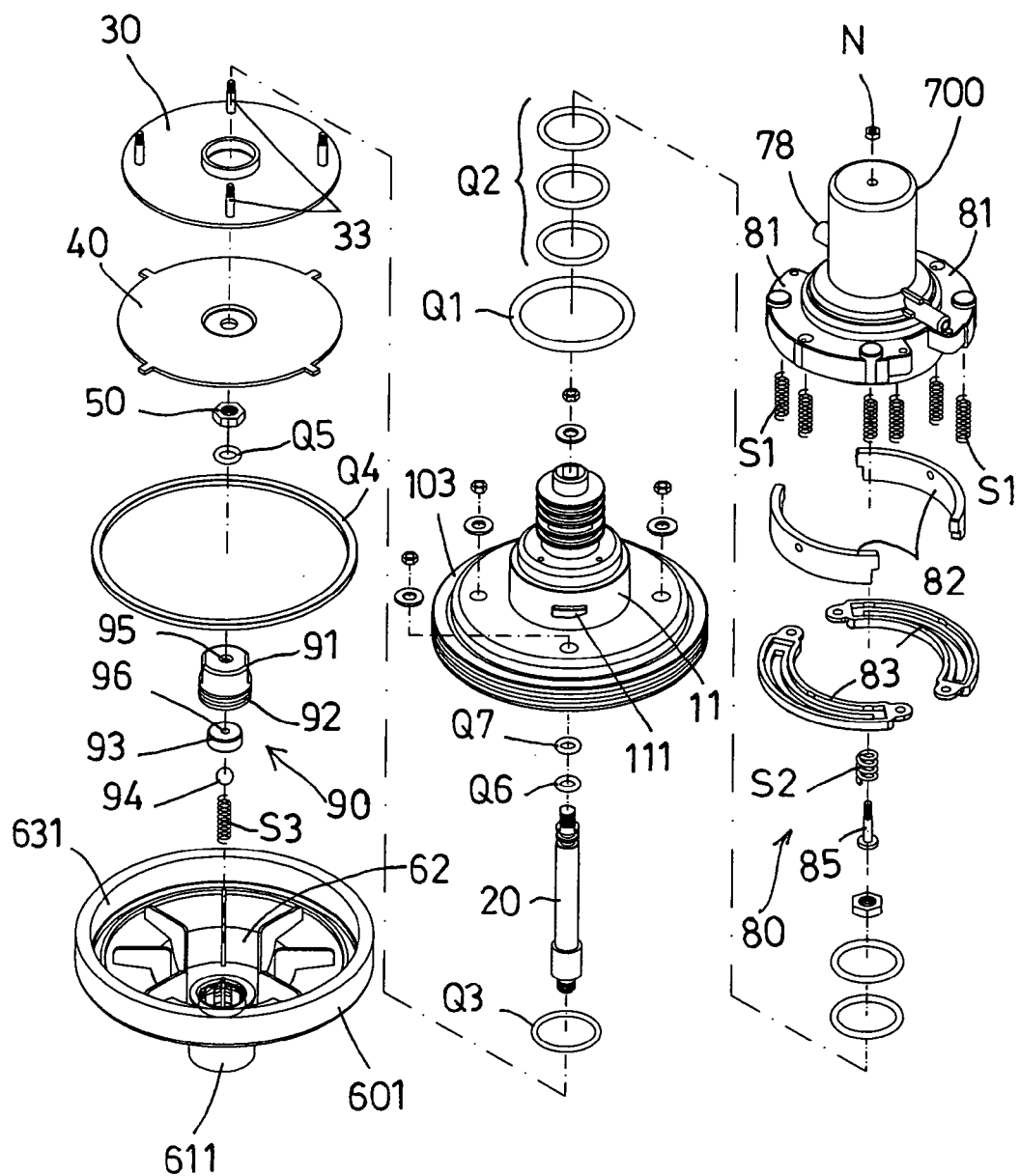
FIG. 11 is an exploded view as seen from the upper portion of the electrolyzer as that shown in FIG. 10.
Figure 12:
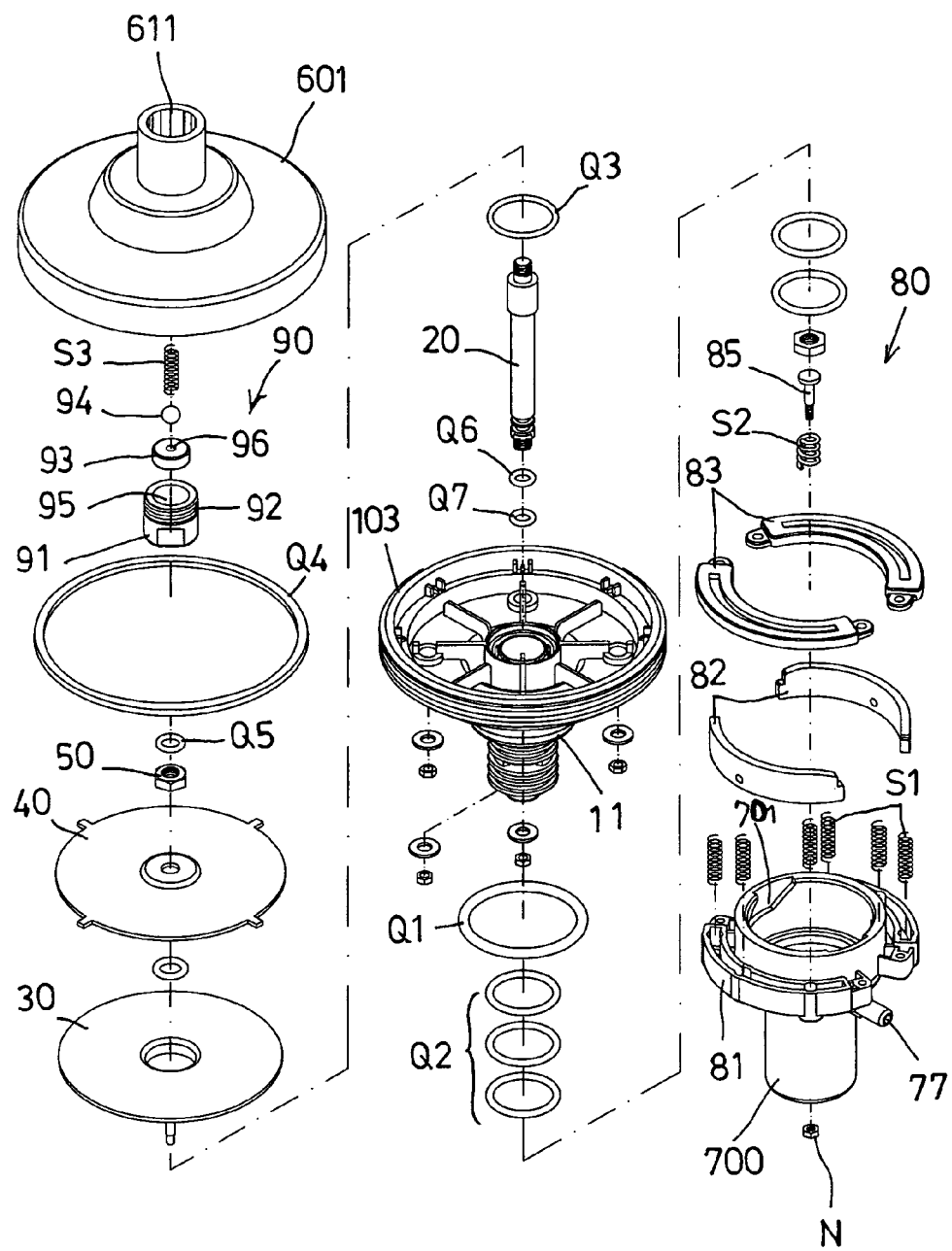
FIG. 12 is an exploded view as seen from the bottom portion of the electrolyzer as that shown in FIG. 10.

In the fourth embodiment, the radial flowing type electrolyzer in accordance with the present invention may be arranged in the form as disclosed in the previous first embodiment (as shown in FIG. 1), i.e., the housing 10 is disposed below the cover 60, except this, the radial flowing type electrolyzer in accordance with the present invention may also be arranged in the form as a fourth embodiment, as shown in FIGS. 10, 11 and 12. FIG. 10 shows a perspective and cross sectional view of the fourth embodiment, and FIGS. 11, 12 show the operating condition of the fourth embodiment. The housing 103, the receptacle 700, the cover 601, the anode plate 30 and the cathode plate 40 are disposed up side down or disposed reversely, an electric connecting device 80 is required to be disposed, and the receptacle 700 may be formed into a quick release type structure. The anolyte outlet is normally greater in diameter than the catholyte outlet and disposed in the upper portion, when the anolyte outlet is disposed below the catholyte outlet and includes a diameter greater than that of the catholyte outlet, the catholyte 88 may not suitably flow upwardly and may be mixed with the anolyte 99, such that a check valve 90 is provided and secured to the cover 601.

The housing 103 includes a catch 111, and the receptacle 700 includes a latch groove 701 corresponding to the catch 111, for quickly coupling the housing 103 and the receptacle 700. The electric connecting device 80 includes two sockets 81 disposed outside the receptacle 700 and disposed close to the positive electrodes 33 of the anode plate 30 for receiving springs S1 and conductors 82, and two caps 83 secured to the sockets 81 for retaining the springs S1 and the conductors 82 in the sockets 81, and the conductors 82 may be biased by the springs S1 to electrically couple to the positive electrodes 33 of the anode plate 30. The electric connecting device 80 includes a casing 84 provided therein and disposed close to the receptacle 700 and the conductor tube 20 (FIG. 13) for receiving a spring member S2 and another conductor 85, a fastener or lock nut N is attached or secured onto the conductor 85 for anchoring or retaining the conductor 85 to the casing 84 and the receptacle 700 and for preventing the conductor 85 from being disengaged from the casing 84 and the receptacle 700, and the conductor 85 may be biased and forced to engage with the conductor tube 20 with the spring member S2.

The cover 601 includes an inner thread for coupling to a check valve 90. The check valve 90 includes a container 91 secured to an outlet mouth 611 of the cover 601 with a threading engagement 92, the container 91 includes a gasket 93, ball or detent 94, and a spring member S3 disposed therein, and includes an opening 95 formed therein and a valve seat 96 provided therein, and includes several equally spaced passages 97 (FIG. 13) formed in the container 91. The ball or detent 94 may be biased and forced to selectively engage with the valve seat 96 and the gasket 93 and to increase the pressure at the outlet portion of the outlet mouth 611 of the cover 601, the pressure may be changed or adjusted according to different flexibility of the spring member S3, in order to suitably force the catholyte 88 to flow out through the outlet port 77 of the receptacle 700, in order to solve the problem that the catholyte 88 may not flow upwardly and may be mixed with the anolyte 99.

Figure 13:
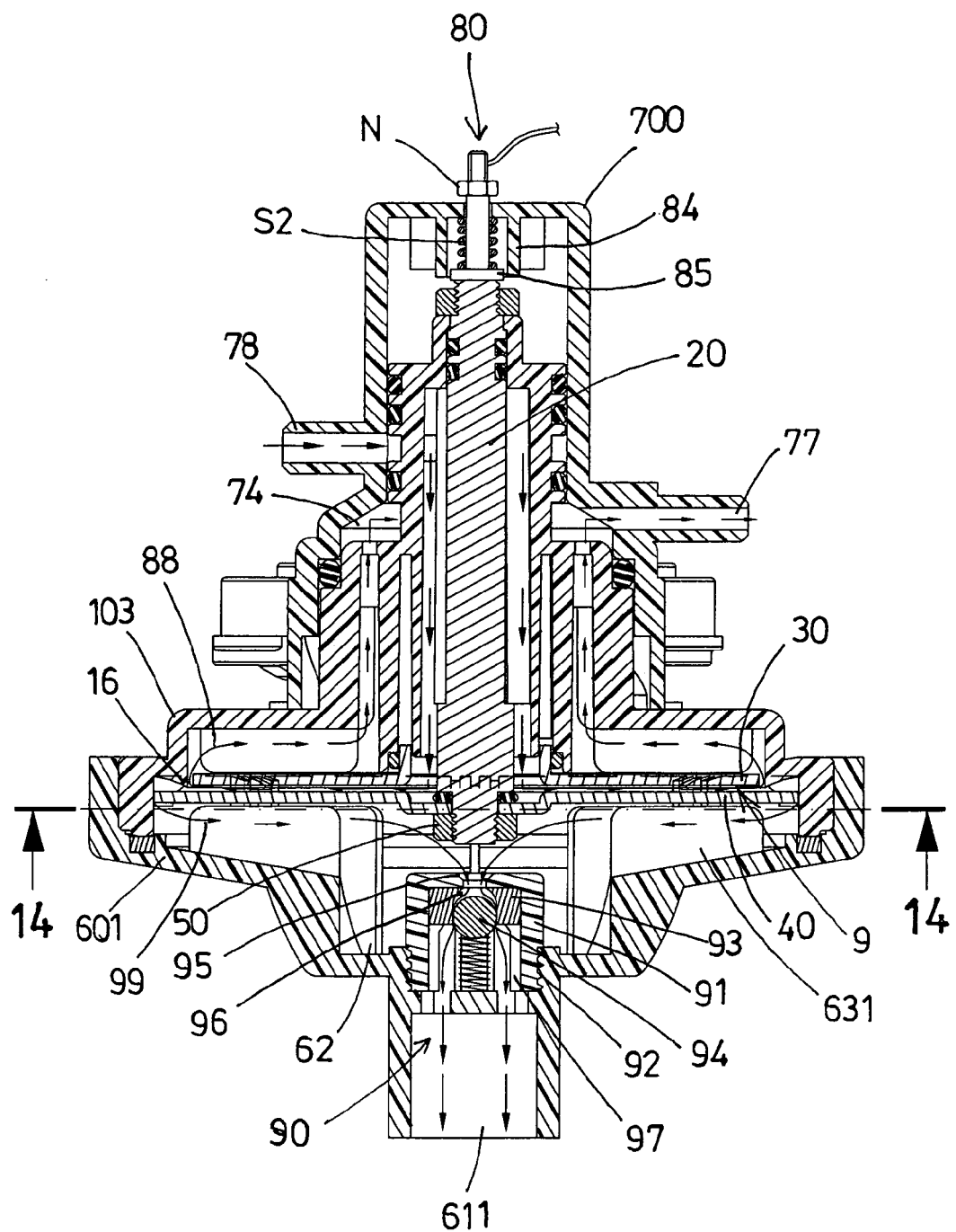
FIG. 13 is a cross sectional view of the electrolyzer as seen from one side portion of the electrolytic cell or electrolyzer of that shown in FIG. 10.
Figure 14:
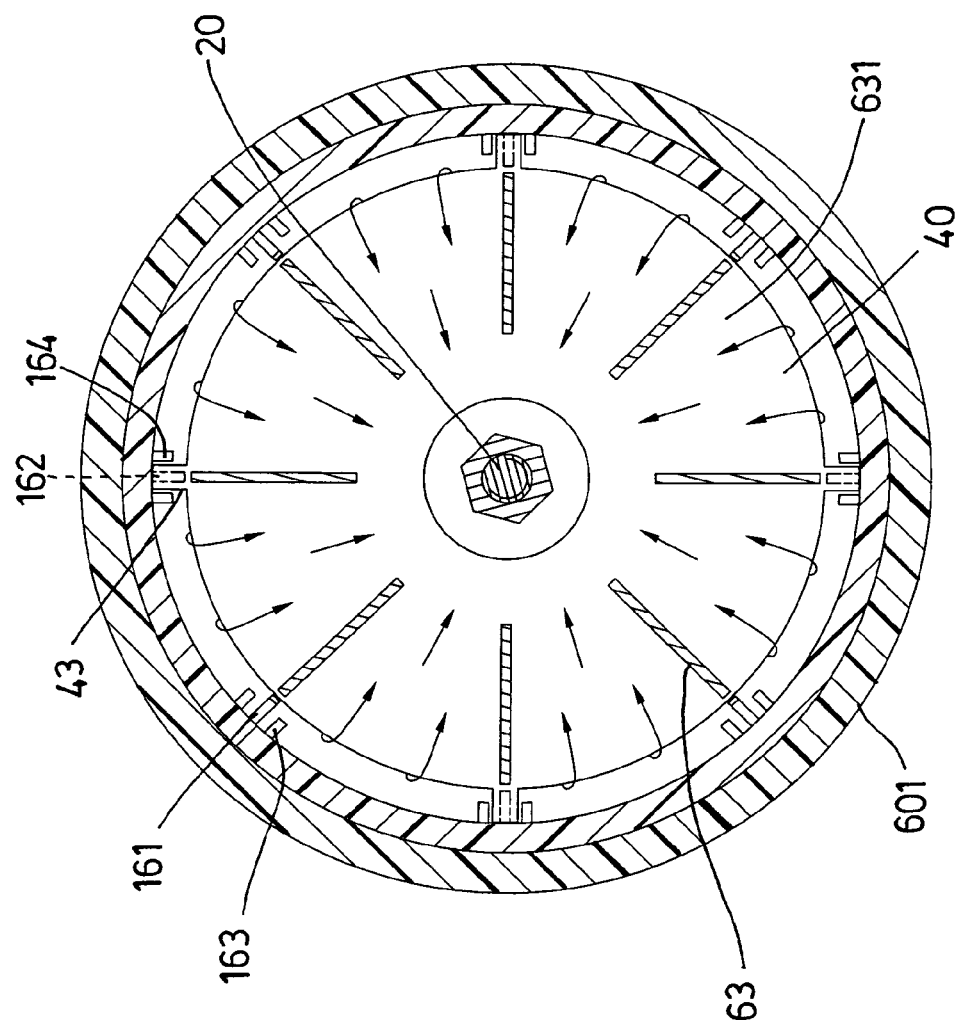
FIG. 14 is a cross sectional view of the electrolyzer taken along lines 14-14 of FIG. 13.
Figure 15:
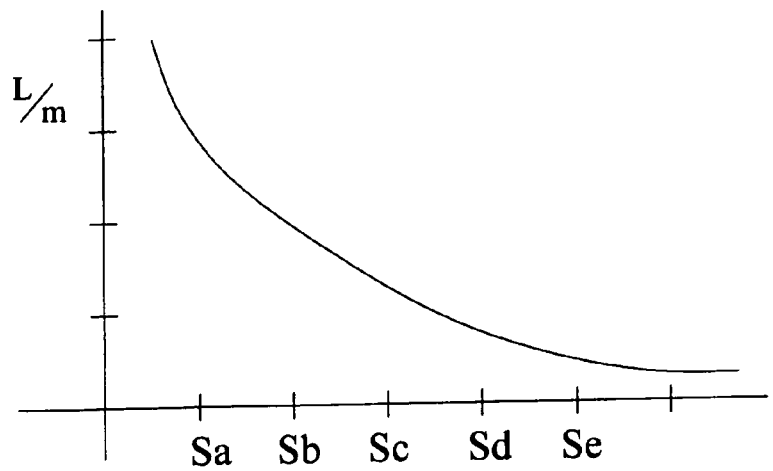
FIG. 15 is a diagram illustrating the changing of the flowing speed of the flowing electrolyte or water.
Figure 15:
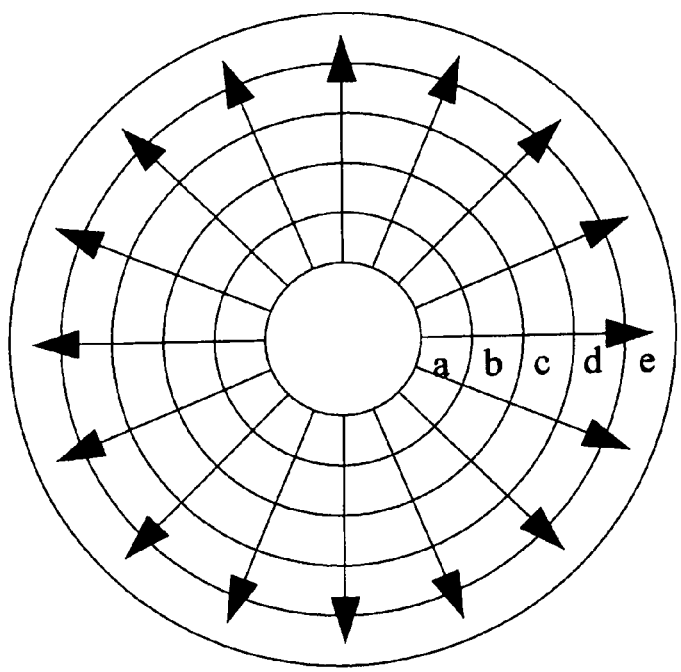
Figure 16:
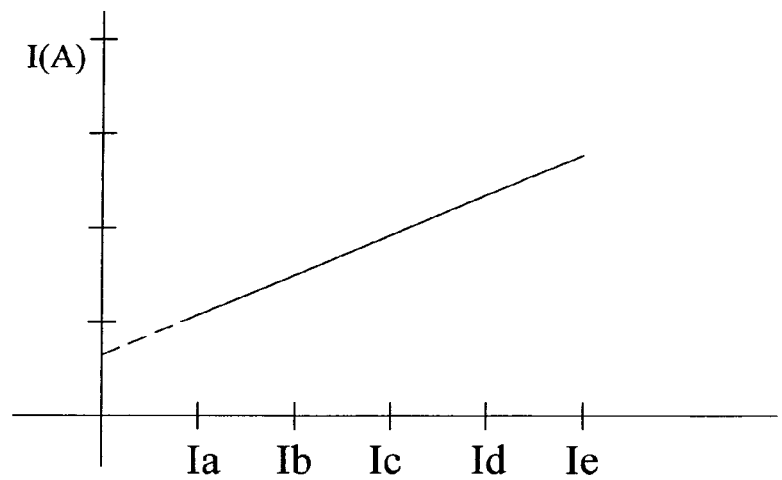
FIG. 16 is another diagram illustrating the changing of the electric current of the flowing electrolyte or water.
Figure 16:
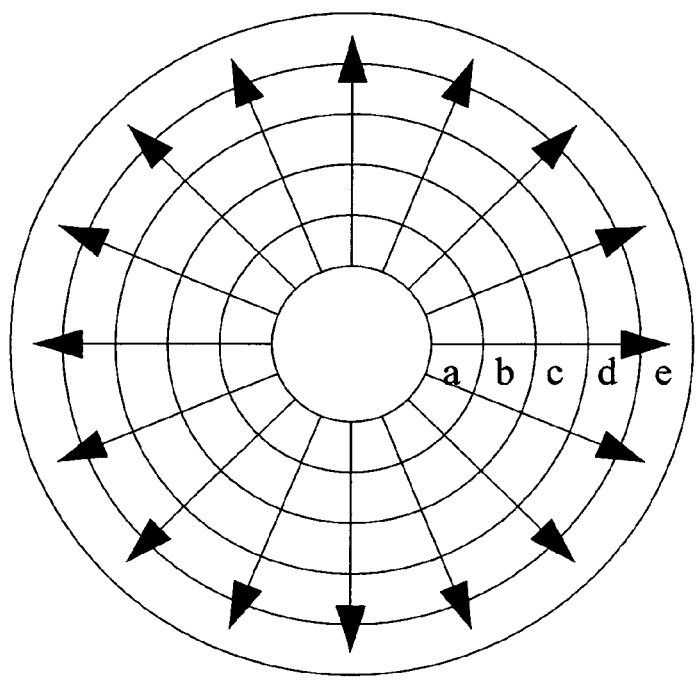

In the fourth embodiment, the operating condition is shown in FIGS. 13, 14. FIGS. 13, 14 show the operating condition and the cross sectional condition of the fourth embodiment. While in operation, the catholyte 88 and the anolyte 99 may be generated with the anode plate 30 and the cathode plate 40 and separated by the separator tip 16, when the anolyte 99 flows downwardly to the compartment 62 of the cover 601, the check valve 90 may prevent the catholyte 88 from flowing downwardly, the catholyte 88 is then guided to flow into the chamber 74 of the receptacle 700 and to flow out through the outlet port 77 of the receptacle 700, the anolyte 99 may flow through the ball or detent 94 and may flow out through the outlet mouth 611 of the cover 601.

In the radial flowing type electrolyzer in accordance with the present invention, the inlet cross area is far smaller than that of the outwardly flowing passage at the outer peripheral portion, such that the flowing speed of the outwardly flowing electrolytic water may be decreased and may be stabilized, and may stably flow radially and outwardly and may prevent the anolyte and the catholyte from being mixed or blended with each other, and the electric current is greater at the outer peripheral portion, for generating a skin effect at the outer peripheral portion, such that the spacing distance between the anode plate 30 and the cathode plate 40 may be slightly increased, for allowing the flowing space for the electrolytic water to be suitably increased, and for allowing the anolyte and the catholyte to be suitably separated from each other. The anode plate 30 and the cathode plate 40 may be changed with each other.

Practicability

The present invention is to provide a radial flowing type electrolyzer which may suitably separate the anolyte and the catholyte from each other, and may decrease and stabilize the outwardly flowing electrolytic water and may prevent a turbulent flow from being generated, no additional discharging facilities are required, such that the manufacturing cost may be decreased and may solve the germs growing problem and the calcium depositing problem, the electrolyzer may be disposed below the water tank of the drinking water machine for allowing the water to easily flow into the electrolyzer without additional tubes and pipes, the electrolyzer may be locked without screws and bolts, the spacing distance between the anode plate 30 and the cathode plate 40 may be increased or adjusted for allowing the flowing space for the electrolytic water to be suitably increased, and for allowing the anolyte and the catholyte to be suitably separated from each other.

I claim:

1. An electrolyzer comprising a housing, a cover, an anode plate, a cathode plate, a conductor tube, and a receptacle, wherein:

said housing includes a plurality of radially extended ribs on an upper portion, for forming an upper space between said ribs, said housing includes one or more orifices formed therein for engaging with one or more positive electrodes of said anode plate, said housing includes a casing, and a cylindrical member, extended from said casing, having fins extended on inner and outer portions for forming water flowing passages, and a separator tip provided around an outer portion of said anode plate and said cathode plate for separating an anolyte and a catholyte from each other, said cover covers the housing to form a chamber of said housing and said cover and includes an outlet mouth, said anode plate is disposed above said ribs of said housing, and includes a center hole, wherein said one or more positive electrodes are extended from said anode plate, said cathode plate is disposed above said anode plate and includes a bore formed therein for engaging with said conductor tube, said conductor tube is secured to said bore of said cathode plate for coupling to a negative electric power source, said receptacle includes a compartment, and includes a peripheral surface and a peripheral shoulder of different inner diameters, for receiving said casing of said housing and said conductor tube, and includes an outlet port communicating with a peripheral channel of said housing and an inlet port communicating with said inner portion of said conductor tube and said center hole of said anode plate, in operation, water is supplied to said inlet port of said receptacle and said hole of said anode plate for generating the anolyte and the catholyte with said cathode plate and said anode plate to be attracted towards said cathode plate and said anode plate respectively, and the anolyte and the catholyte flow radially and outwardly to an outer peripheral region of said cathode plate and said anode plate separated by said separator tip, said catholyte is guided to flow through said peripheral channel and then through said outlet port of said receptacle and said anolyte is guided to flow through said chamber of said housing and said cover and then through said outlet mouth of said cover.

2. The electrolyzer as claimed in claim 1, wherein said housing includes at least one spacer extended radially and located below said cathode plate for engaging with said cathode plate, and two protrusions disposed beside said at least one spacer, said cathode plate includes at least one finger extended radially and outwardly of said cathode plate for engaging with said at least one spacer of said housing and for spacing said cathode plate from said anode plate at a smallest spacing distance.

3. The electrolyzer as claimed in claim 2, wherein the housing includes at least one second spacer disposed beside said at least one spacer, and at least one second protrusion disposed beside said at least one second spacer.

4. The electrolyzer as claimed in claim 1, wherein said anode plate includes at least one fence and said cathode plate includes a peripheral recess for reinforcing purposes.

5. The electrolyzer as claimed in claim 1, wherein said anode plate and said cathode plate are changeable with each other.

6. The electrolyzer as claimed in claim 1, wherein said housing, said cover, said anode plate and said cathode plate are circular, and said housing is threaded to said cover.

7. The electrolyzer as claimed in claim 1, wherein said housing includes a plurality of equally spaced outlet ports formed and located below said peripheral channel, said receptacle includes a chamber formed therein corresponding to said outlet ports of said housing, said cover includes a compartment formed around said outlet mouth.

8. An electrolyzer comprising a housing, a cover, an anode plate, a cathode plate, a conductor tube, and a receptacle, wherein:
    said housing includes a plurality of radially extended ribs on an upper portion, for forming an upper space between said ribs, said housing includes one or more orifices formed therein for engaging with one or more positive electrodes of said anode plate, said housing includes a casing, and a cylindrical member, extended from said casing, having fins extended on inner and outer portions for forming water flowing passages, and a separator tip provided around an outer portion of said anode plate and said cathode plate for separating an anolyte and a catholyte from each other,
    said cover covers the housing to form a chamber of said housing and said cover,
    said anode plate is disposed above said ribs of said housing and includes a center hole, wherein said one or more positive electrodes are extended from said anode plate,
    said cathode plate is disposed above said anode plate and includes a bore formed therein for engaging with said conductor tube,
    said conductor tube is secured to said bore of said cathode plate for coupling to a negative electric power source and includes a center bore,
    said receptacle includes a compartment, and includes a peripheral surface and a peripheral shoulder of different inner diameters, for receiving said casing of said housing and said conductor tube, and includes an outlet port communicating with a peripheral channel of said housing and an inlet port communicating with said inner portion of said conductor tube and said center hole of said anode plate,
    in operation, water is supplied to said inlet port of said receptacle and said hole of said anode plate for generating the anolyte and the catholyte with said cathode plate and said anode plate to be attracted towards said cathode plate and said anode plate respectively, and the anolyte and the catholyte flow radially and outwardly to an outer peripheral region of said cathode plate and said anode plate separated by said separator tip, said catholyte is guided to flow through said peripheral channel and then through said outlet port of said receptacle and said anolyte is guided to flow through said chamber of said housing and said cover and then through said center bore of said conductor tube.

9. An electrolyzer comprising a housing, a cover, an anode plate, a cathode plate, a conductor tube, and a receptacle, wherein:
    said housing includes a plurality of radially extended ribs on an upper portion, for forming an upper space between said ribs, said housing includes one or more orifices formed therein for engaging with one or more positive electrodes of said anode plate, said housing includes a casing, and a cylindrical member, extended from said casing, having fins extended on inner and outer portions for forming water flowing passages, and a membrane for separating an anolyte and a catholyte from each other,
    said cover covers the housing to form a chamber of said housing and said cover, and includes an outlet mouth,
    said anode plate is disposed above said ribs of said housing and includes a center hole, wherein said one or more positive electrodes are extended from said anode plate,
    said cathode plate is disposed above said anode plate and includes a bore formed therein for engaging with said conductor tube,
    said conductor tube is secured to said bore of said cathode plate for coupling to a negative electric power source,
    said receptacle includes a compartment, and includes a peripheral surface and a peripheral shoulder of different inner diameters, for receiving said casing of said housing and said conductor tube, and includes an outlet port communicating with a peripheral channel of said housing and an inlet ort communicating with said inner portion of said conductor tube and said center hole of said anode plate,
    in operation, water is supplied to said inlet port of said receptacle and said hole of said anode plate for generating the anolyte and the catholyte with said cathode plate and said anode plate to be attracted towards said cathode plate and said anode plate respectively, and the anolyte and the catholyte flow radially and outwardly to an outer peripheral region of said cathode plate and said anode plate separated by said membrane, said catholyte is guided to flow through said peripheral channel and then through said outlet port of said receptacle and said anolyte is guided to flow through said chamber of said housing and said cover and then through said outlet mouth of said cover.

10. An electrolyzer comprising a housing, a cover, an anode plate, a cathode plate, a conductor tube, and a receptacle, wherein:
    said housing includes a plurality of radially extended ribs on an upper portion, for forming an upper space between said ribs, said housing includes one or more orifices formed therein for engaging with one or more positive electrodes of said anode plate, said housing includes a casing, and a cylindrical member, extended from said casing, having fins extended on inner and outer portions for forming water flowing passages, and a separator tip provided around an outer portion of said anode plate and said cathode plate for separating an anolyte and a catholyte from each other, said cover covers the housing to form a chamber of said housing and said cover and includes an outlet mouth, wherein a check valve is secured to said outlet mouth of said cover, said anode plate is disposed below said ribs of said housing and includes a center hole, wherein said one or more positive electrodes are extended from said anode plate, said cathode plate is disposed above said anode plate and includes a bore formed therein for engaging with said conductor tube, said conductor tube is secured to said bore of said cathode plate for coupling to a negative electric power source, said receptacle includes a compartment, and includes a peripheral surface and a peripheral shoulder of different inner diameters, for receiving said casing of said housing and said conductor tube, and includes an outlet port communicating with a peripheral channel of said housing and an inlet port communicating with said inner portion of said conductor tube and said center hole of said anode plate, in operation, water is supplied to said inlet port of said receptacle and said hole of said anode plate for generating the anolyte and the catholyte with said cathode plate and said anode plate to be attracted towards said cathode plate and said anode plate respectively, and the anolyte and the catholyte flow radially and outwardly to an outer peripheral region of said cathode plate and said anode plate separated by said separator tip, said catholyte is guided to flow through said peripheral channel and then through said outlet port of said receptacle and said anolyte is guided to flow through said chamber of said housing and said cover and then through said outlet mouth of said cover.

11. The electrolyzer as claimed in claim 10, wherein said check valve includes a container having a gasket and a detent disposed therein, and includes a valve seat, and a plurality of passages around said valve seat.

12. The electrolyzer as claimed in claim 11, wherein said container includes a spring member disposed therein for biasing said detent to block said valve seat.

13. The electrolyzer as claimed in claim 10, wherein said housing includes a catch for engaging with a latch groove of said receptacle and for detachably coupling said housing and said receptacle together, and said receptacle includes a socket and a casing for engaging with said electrode and said conductor tube, said socket includes a conductor and a spring and blocked with said cover, said conductor is biased by said spring to electrically couple to said positive electrode of said anode plate, said casing includes a second spring member and a second conductor which is biased by said second spring member to electrically couple to said conductor tube.

14. The electrolyzer as claimed in claim 1, wherein said cover includes a plurality of radially extended ribs located in said chamber of said housing and said cover.

\* \* \* \* \*